United States Patent [19]

Freeman

[11] Patent Number: 4,848,262

[45] Date of Patent: Jul. 18, 1989

[54] PRESSURE SENSITIVE RELEASE DEVICE

[75] Inventor: Willie B. Freeman, Irwin, Pa.

[73] Assignee: The United States of America as represented by the Secretary of the Navy, Washington, D.C.

[21] Appl. No.: 236,696

[22] Filed: Aug. 25, 1988

[51] Int. Cl.[4] .............................................. B63B 21/52
[52] U.S. Cl. ...................................... 114/367; 403/31; 403/32; 24/602; 441/10
[58] Field of Search ............. 114/367, 221 R; 441/10; 74/2; 403/31, 32; 24/602

[56]  References Cited

U.S. PATENT DOCUMENTS

| | | | |
|---|---|---|---|
| 2,360,848 | 10/1944 | Bryant | 114/367 |
| 2,736,562 | 2/1956 | Blackburn | 279/76 |
| 3,080,582 | 3/1963 | Reffell | 114/345 |
| 3,094,345 | 6/1963 | Gaylord | 403/326 |
| 3,563,098 | 2/1971 | Gley | 74/2 |
| 3,721,462 | 3/1973 | Pawlitzki | 376/233 |
| 3,727,575 | 4/1973 | Prachar | 74/2 |
| 3,779,004 | 12/1973 | Gloeckler | 24/602 |

*Primary Examiner*—Joseph F. Peters, Jr.
*Assistant Examiner*—Edwin L. Swinehart
*Attorney, Agent, or Firm*—Susan E. Verona; John M. O'Meara

[57]  ABSTRACT

A release mechanism is triggered when the pressure differential on the sidewall of a sealed container reaches a predetermined threshold level at which the container either implodes or explodes to sufficiently decrease the spacing between the ends of the container and thereby achieve the release. False triggering due to percussion or shock waves may be precluded by disposing a shield about the sidewall.

11 Claims, 3 Drawing Sheets

PRESSURE SENSITIVE RELEASE DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a pressure sensitive release device for interconnecting member ends to maintain tension therebetween and more particularly, to such a device wherein the release feature results from a sealed container being deformed when a threshold pressure is reached.

Pressure sensitive release devices have many applications, such as to unleash life rafts on a sinking ship or oxygen masks in a depressurized airplane. Many release mechanisms are known which could possibly be adapted with a pressure sensitive feature, such as those disclosed and claimed in U.S. Pat. Nos. 3,094,345 and 3,563,098. Furthermore, soluble and absorbing materials have been utilized to trigger release mechanisms, as is discussed in U.S. Pat. No. 3,080,582. All such release mechanisms usually contain springs and/or ball detents, so as to involve significant design complexity which of course would be magnified by adding a pressure sensitive feature thereto.

SUMMARY OF THE INVENTION

It is the general object of the present invention to provide a pressure sensitive release device of simple design in that no springs or ball detents are included therein.

It is a specific object of the present invention to provide a pressure sensitive release device in accordance with the above stated general object and which can not be triggered by percussion or shock waves.

It is another specific object of the present invention to provide a release mechanism for unleashing life rafts from sinking ships in accordance with the above stated general object.

These and other objects are accomplished using the release mechanism concept of this invention by which a sealed container is deformed to trigger the release when the surrounding environment reaches a predetermined threshold pressure. False triggering due to percussion or shock waves is precluded by disposing a shield about the deformable wall of the sealed container. Life rafts are unleashed with the preferred embodiment of the invention in which a metal can is utilized as the sealed container.

The scope of the present invention is only limited by the appended claims for which support is predicated on the preferred embodiments hereinafter set forth in the following description and the attached drawings wherein like reference characters refer to like elements throughout the several figures.

DESCRIPTION OF THE PREFERRED EMBODIMENTS

Figure 1:
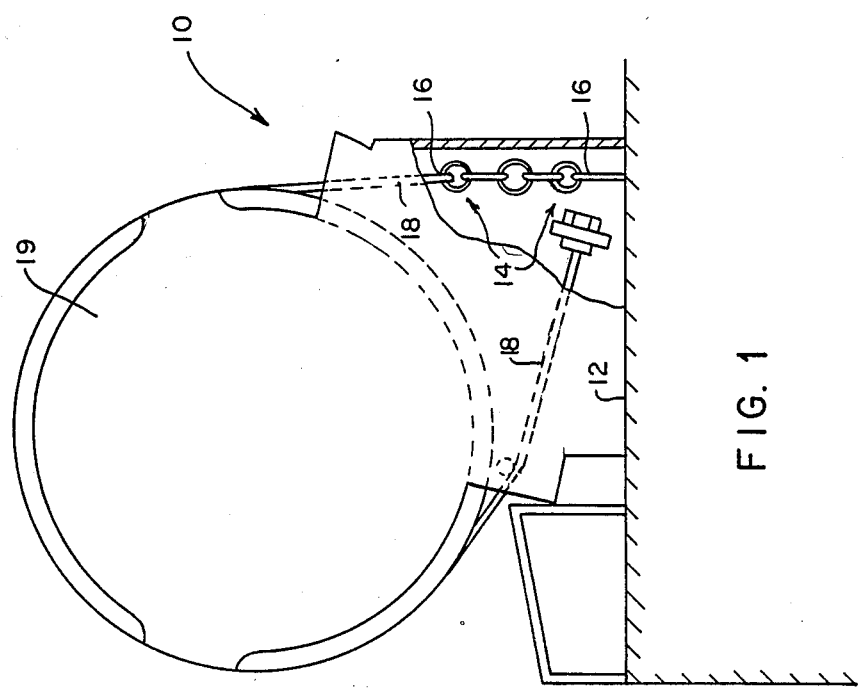
FIG. 1 illustrates a shipboard raft stowage arrangement having one preferred embodiment of the invention incorporated therein.

In FIG. 1, a life raft stowage arrangement 10 on a ship's deck 12 is shown to include a pressure sensitive release device 14 which operates in accordance with the invention. The release device 14 interconnects member ends 16 to maintain tension therebetween and is designed to trigger if the ship sinks to some predetermined water depth, such as 25 foot. Of course, at least one member end 16 is disposed on a lashing cable 18 which wraps tightly about a life raft package 19. When the release device 14 triggers, the lashing cable 18 is unleased and the life raft package 19 floats to the surface of the water.

Figure 2:
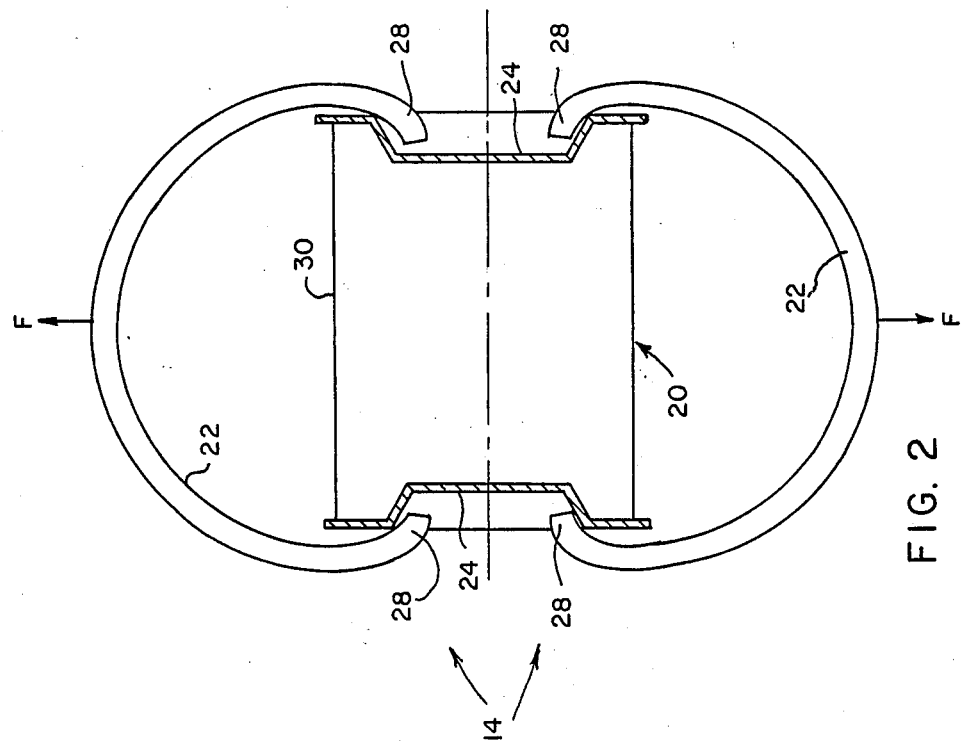
FIG. 2 is a partially sectioned view for one preferred embodiment of the pressure sensitive release device to which the invention relates.

One preferred embodiment of the pressure sensitive release device 14 is shown in FIG. 2 where a sealed container 20 having some internal pressure level and individual buckles 22 for attachment to each member end 16 are included. The member ends 16 apply tension to the buckles 22, as indicated by the forces F in FIG. 2. Container 20 has recessed ends 24, aligned along one major axis 26 thereof, while each buckle 22 is configured to extend across the container 20 along axis 26 and has at least one catch stub 28 extending therefrom into each recessed end 24.

The container 20 includes a sidewall 30 which extends between the recessed ends 24 and encounters a differential pressure magnitude thereagainst, depending on the internal pressure level of the container 20 and the ambient pressure external thereto. For any given thickness of the sidewall 30, deformation will occur therein when that differential pressure reaches some predetermined magnitude. Of course, such deformation will tend to implode or crush the container 20 if the ambient pressure is greater than the internal pressure and explode or bulge the container 20 if the internal pressure is greater than the ambient pressure. Regardless of whether the deformation crushes or bulges the container 20, it causes the spacing or distance between the recessed ends 24 thereof to decrease, which at some point results in the catch stubs 28 being pulled from the recessed ends 24 due to the tension on the member ends 16. Consequently, the thickness of the sidewall 30 can be selected so that sufficient deformation occurs therein to release the buckles 22 when the pressure differential reaches a predetermined magnitude. Because either implosive or explosive deformation can be utilized to trigger the release device 14 of this invention, it can be adapted for many different applications other than the life raft stowage arrangement 10. Another implosive application would be in a blast alarm system which would trigger when an impulse or spike is encountered in the ambient pressure due to the shock wave of a blast. One example of an explosive application would be in an airplane depressurization alarm system which would be triggered when the ambient pressure drops to the point where oxygen masks must be made available for life support.

Figure 4:
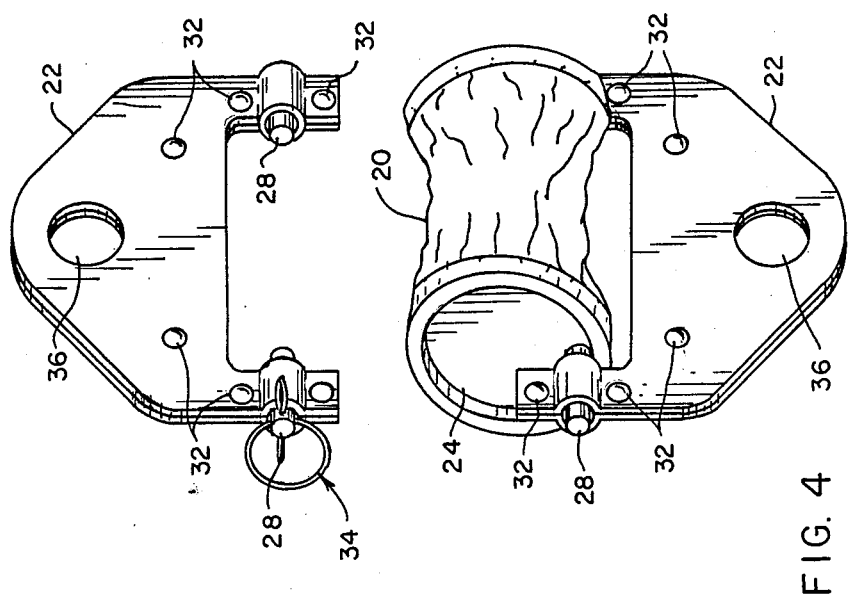
FIG. 4 illustrates how the sealed container in the FIG. 3 embodiment deforms under pressure to accomplish the release feature.
Figure 3:
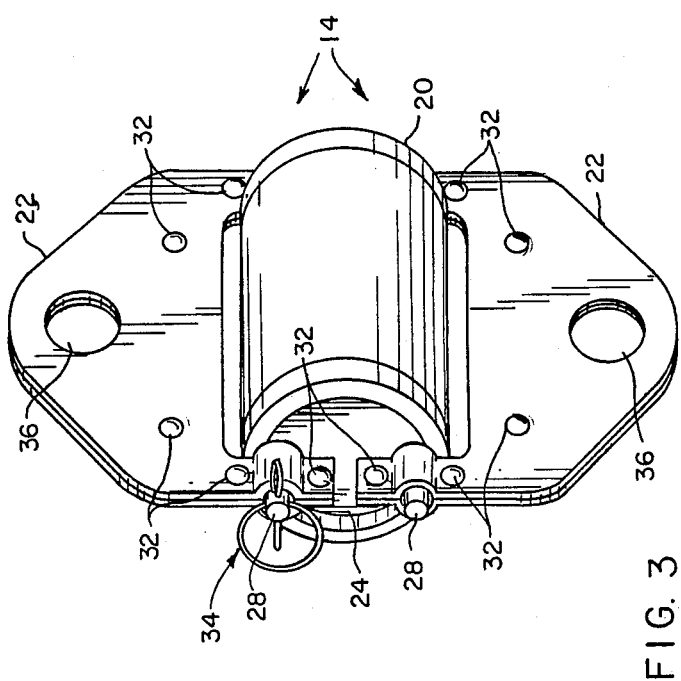
FIG. 3 illustrates another preferred embodiment of the pressure sensitive release device to which the invention relates.
Figure 5:
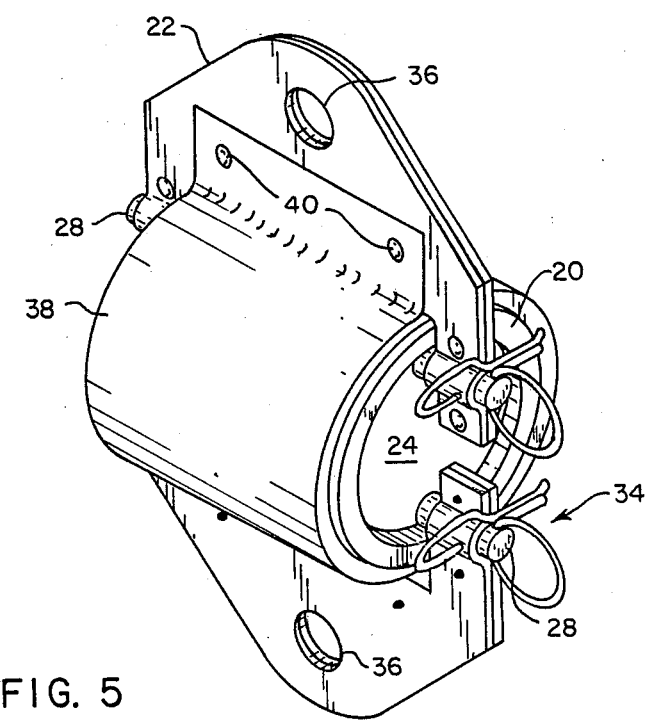
FIG. 5 illustrates the use of a shield with the FIG. 3 embodiment to preclude false triggering from percussion or shock waves.

An enhanced design of the pressure sensitive release device 14 for use in the life raft stowage arrangement 10 is depicted by FIGS. 4 and 5 wherein a metal can is disposed as the sealed container 20 while the buckles 22 are fabricated of laminated sheet metal which is configured to retain pins that serve as the catch stubs 28. The metal can 20 includes the recessed ends 24, and rivets 32 are utilized to retain the laminated structure of the buckles 22. Conventional pull loop and pin arrangements 34 are utilized with the pins 28 to provide means for the removal of the buckles 22 from the release device 14 without imploding the can 20. Apertures 36 are disposed through each laminated buckle 22 to provide means for attaching the member ends 16 (see FIG. 1) thereto. As depicted in FIG. 4, at least one of the buckles 22 pulls away upon actuation of the device 14 when the can 20 is deformed by the predetermined pressure differential.

A shield 38 can be disposed about the can 20 as shown in FIG. 5 to preclude false triggering of the device 14, such as when an impulse or spike is encountered in the ambient pressure due to the shock wave of a gun blast. Of course, the shield 38 is secured to only one of the buckles 22 by screws 40, so as not to hamper the operation of the release device 14. Those skilled in the art will appreciate without any further explanation that other modifications and variations are possible to the above disclosed pressure sensitive release device embodiments, within the concept of this invention. Consequently, it should be understood that all such modifications and variations fall within the scope of the following claims.

What I claim is:

1. A pressure sensitive release device for interconnecting between at least two member ends to maintain tension therebetween, said device comprising:
   a sealed container having some internal pressure level and having recessed ends aligned along one major axis thereof; and
   a separate buckle for attachment to each member end and being configured to extend across said container with at least one catch stub extending therefrom into each said recessed end;
   said container being deformed by a predetermined pressure differential thereagainst to decrease the distance between said recessed ends thereof and cause said catch stubs to be released therefrom as the result of the tension on said buckles.

2. The device of claim 1 wherein said internal pressure level and the sidewall thickness of said container are selected to derive the desired deformation thereof at a predetermined depth in a liquid.

3. The device of claim 2 wherein a shield is disposed exteriorally thereon about said sidewall to preclude compressive deformation thereof due to percussion or shock waves.

4. The device of claim 1 wherein said internal pressure level and the sidewall thickness of said container are selected to derive the desired deformation thereof at a predetermined altitude above sea level.

5. The device of claim 1 wherein said container is a metal can having the sidewall thickness and said internal pressure level thereof selected to derive the desired deformation thereof at a 25-foot depth in seawater.

6. The device of claim 5 wherein a shield is disposed on said device externally about said sidewall to avoid deformation thereof due to percussion or shock waves.

7. A life raft stowage rack of the type wherein lashing is utilized to secure the stowage and at least one pressure sensitive release device interconnects between at least one member end on the lashing and another member end to maintain tension therebetween, each said device comprising:
   a sealed container having some internal pressure level and having recessed ends aligned along one major axis thereof;
   a separate buckle attached to each member end and being configured to extend across said container with at least one catch stub extending therefrom into each said recessed end;
   said container being deformed by a predetermined pressure differential thereagainst to decrease the distance between said recessed ends thereof and cause said catch stubs to be released therefrom as the result of the tension on said buckles.

8. The rack of claim 7 wherein said internal pressure level and the sidewall thickness of said container are selected to derive the desired deformation thereof at a predetermined depth in a liquid.

9. The rack of claim 7 wherein a shield is disposed exteriorly thereon about said sidewall to preclude compressive deformation thereof due to percussion or shock waves.

10. The rack of claim 7 wherein said container is a metal can having the sidewall thickness and said internal pressure level thereof selected to derive the desired deformation thereof at a 25-foot depth in seawater.

11. The device of claim 10 wherein a shield is disposed on said device externally about said sidewall to avoid deformation thereof due to percussion or shock waves.

* * * * *